US007206751B2

(12) United States Patent
Hack et al.

(10) Patent No.: US 7,206,751 B2
(45) Date of Patent: Apr. 17, 2007

(54) VALUE CHAIN OPTIMIZATION SYSTEM AND METHOD

(75) Inventors: Stefan Hack, Wiesloch (DE); Michael Augsburger, Dossenheim (DE); Miho Birimisa, Karlsruhe (DE)

(73) Assignee: SAP AG, Walldorf (DE)

( * ) Notice: Subject to any disclaimer, the term of this patent is extended or adjusted under 35 U.S.C. 154(b) by 1111 days.

(21) Appl. No.: 09/987,356

(22) Filed: Nov. 14, 2001

(65) Prior Publication Data

US 2002/0065696 A1 May 30, 2002

Related U.S. Application Data

(63) Continuation-in-part of application No. 09/609,714, filed on Jun. 30, 2000.

(60) Provisional application No. 60/191,452, filed on Mar. 23, 2000.

(51) Int. Cl.
*G06Q 10/00* (2006.01)
(52) U.S. Cl. .......................... 705/7; 715/848; 345/440
(58) Field of Classification Search ............... 705/7–9
See application file for complete search history.

(56) References Cited

U.S. PATENT DOCUMENTS

| 4,813,013 | A | * | 3/1989 | Dunn ............................ 715/763 |
| 5,621,871 | A | * | 4/1997 | Jaremko et al. ............ 345/441 |
| 5,884,287 | A |   | 3/1999 | Edesess ........................ 705/36 |
| 5,887,154 | A | * | 3/1999 | Iwasa et al. .................... 703/6 |
| 5,953,707 | A | * | 9/1999 | Huang et al. ................. 705/10 |
| 6,119,149 | A |   | 9/2000 | Notani ........................ 709/205 |
| 6,233,493 | B1 | * | 5/2001 | Cherneff et al. .............. 700/95 |
| 6,243,101 | B1 | * | 6/2001 | Erskine ...................... 345/619 |
| 6,393,425 | B1 | * | 5/2002 | Kelly .......................... 707/100 |
| 6,460,058 | B2 | * | 10/2002 | Koppolu et al. ............ 715/738 |
| 6,604,114 | B1 | * | 8/2003 | Toong et al. ............. 707/104.1 |

FOREIGN PATENT DOCUMENTS

JP 11316780 A * 11/1999

OTHER PUBLICATIONS

Stephens, Scott; "Supply Chain Council & Supply Chain Operations Reference (SCOR) Model Overview", May 1999, pp. 1-31.*
Hakanson, Bill; "Supply Chain Letter", Nov. 1998, web.archive.org webpage of Dec. 5, 1998, web.archive.org/web/19981205005230/www.supply-chain.org/html/about_sec.htm.*
Anonymous, "Global link missing from supply chain model", Aug. 1999, Transportation & Distribution. Cleveland:. vol.40, Iss. 8; p. 7, 2 pgs.*

(Continued)

*Primary Examiner*—Tariq Hafiz
*Assistant Examiner*—Jonathan G Sterrett
(74) *Attorney, Agent, or Firm*—Mintz, Levin, Cohn, Ferris, Glovsky and Popeo, P.C.

(57) ABSTRACT

The activities and interactions between participants in a collaborative business scenario are displayed as various views of polygons that are positioned to communicate interactions, communications, implementations, and qualitative and quantifiable business benefits resulting in successful optimization of an enterprise's value chain.

7 Claims, 12 Drawing Sheets

OTHER PUBLICATIONS

Anonymous, "SCOR model users get new benchmarking tool", Apr. 8, 1999, Purchasing. Boston:. vol.126, Iss. 5; p. 33, 2 pgs.*

Anonymous, "SCOR model is key link to stronger supply chain", Sep. 1998, Automatic I.D. News. Cleveland:. vol. 14, Iss. 10; p. 52 (4 pages).*

Baer, Tony, "What's brewing: Java and manufacturing", Jul. 1997, Manufacturing Systems Hot Issues for Hot Times Supplement, pp. 2-8, Dialog 01493138 01-44126.*

Sabatina Scelza, "Informationstechnologische Unterstützung des Supply Chain Management," (Dissertation, J. W. Goethe Univ., Aug. 13, 1999).

A. W. Scheer, "Business Process Engineering," (Springer-Verlag, $2^{nd}$ edition, 1994).

Thomas Hess/Leo Brecht, "State of the Art des Business Process Redesign—Darstellung unde Vergleich bestehender Methoden," (Gabler Jan. 1995).

* cited by examiner

The Collaboration Scorecard
Collaborative Business - Supplier Workplace  321"
Quantifying the Value Creation for each Partner within the Collaborative Network

| Business Benefit | OEM | | | Supplier 322" | | | Carrier 323" EXAMPLE | | |
|---|---|---|---|---|---|---|---|---|---|
| | Value Base (e.g. Inventory) | Percentage of Improvement | Benefit Value for Partner | Value Base (e.g. Inventory) | Percentage of Improvement | Benefit Value for Partner | Value Base (e.g. Inventory) | Percentage of Improvement | Benefit Value for Partner |
| Best Data Quality in Real-Time | 1500000 | 20% | 300000 | 300000 | 20% | 60000 | | | |
| Avoiding Delays Due to Missing Data | 2300000 | 50% | 1150000 | 350000 | 40% | 140000 | | | |
| Increase Number of Suppliers Connected Electronically | | | | | | | | | |
| Reduction in Manpower Required for Data Entry | 800000 | 30% | 240000 | 100000 | 30% | 300000 | | | |
| Reduced Set-Up Cost | | | | 250000 | 50% | 125000 | 150000 | 80% | 120000 |
| Reduced Operating Cost | 1500000 | 50% | 750000 | 100000 | 50% | 50000 | 100000 | 50% | 50000 |
| Reduced Administration Cost | 100000 | 50% | 50000 | 100000 | 50% | 50000 | 50000 | 50% | 25000 |
| Total Value Potential by Business Partner (per annum basis) | | | 2,490,000 | | | 455,000 | | | 195,000 |

VALUE CHAIN OPTIMIZATION SYSTEM AND METHOD

RELATED APPLICATIONS

This is a continuation-in-part of pending U.S. patent application Ser. No. 09/609,714, entitled "VALUE CHAIN OPTIMIZATION SYSTEM AND METHOD," filed Jun. 30, 2000 and incorporated herein by reference. Provisional U.S. Patent Application No. 60/191,452 entitled "VALUE CHAIN OPTIMIZATION SYSTEM AND METHOD" filed Mar. 23, 2000, is relied upon and is incorporated by reference in its entirety in this application. Also, this application claims the priority benefit under 35 U.S.C. § 119, and incorporates herein by reference, European Patent Application No. EP 01105484.8, entitled "VALUE CHAIN OPTIMIZATION SYSTEM AND METHOD," filed on Mar. 14, 2001 in Europe, and PCT Application No. PCT/U.S. 01/09197, entitled "VALUE CHAIN OPTIMIZATION SYSTEM AND METHOD," filed on Mar. 23, 2001 in the United States.

BACKGROUND OF THE INVENTION

1. Field of the Invention

This invention relates generally to data processing systems and, more particularly, to value chain optimization in business scenarios.

2. Description of the Related Art

Every day, more businesses gain access to the Web, and create electronic commerce systems. Electronic commerce, or "e-commerce," is the term often used to refer to providing goods and services to consumers and/or other businesses using the Internet. E-commerce is a unique opportunity for businesses of any size and can expand a business's marketplace.

Developing a coherent e-commerce initiative can take an enormous amount of resources. Simply purchasing a Web server and Internet shopping software does not enable a business to profit from e-commerce, regardless of the business. That is, intensifying global competition, increasing customer demands, and rapidly changing markets require a business wanting to create an e-commerce business initiative to develop not only new business models but also new ways to represent these models. Current business models do not conform well with "Internet time" and should be redefined for suitability in the e-commerce age.

To help a business redefine its business model and gain a more refined control over various e-commerce business processes, the concept of "business modeling" has become important to help optimize business processes. Business modeling may include creating a set of "navigational maps" that help businesses expand into and/or "engineer" a new area. The models may be a set of tools, or charts corresponding to various business scenarios and business processes (e.g., organizational charts, workflows, tasks, hierarchy charts, entity relationship models, and process matrixes).

To visualize business processes and scenarios, businesses use both "Value Chains" and "Event Driven Process Chains" (EPCs). Value chains are chains of value-added events starting from a beginning of the making of an end-product (or service) through the completion of the making of the end-product. Thus, a value chain describes the creation process from raw material until the final product.

EPCs are also an integral part in visualizing business processes and scenarios. EPCs link data, tasks, and organizations in various business processes. EPCs depict processes and activities throughout an enterprise as linear flow charts to help the enterprise refine their business. An EPC consists of events (e.g., an order is received), functions (e.g., check order), linking operators that connect events and functions, and a process path that represents logical connections between processes within a business scenario. Although EPCs provide increased levels of optimization when implemented in an enterprise, and accordingly help businesses create e-commerce initiatives, they are limited in their features capability and do not provide any cross-enterprise functionality.

SUMMARY OF THE INVENTION

In accordance with the invention, systems and methods consistent with the present invention create collaboration between members of an e-community within a Collaborative Business Scenario (CBS). Specifically, the CBS combines one enterprise with various business participants from multiple industries contributing to the same value chain to maximize the value potential for the participants involved in the collaboration. The CBS also provides tools to conceive and discuss new collaborative business models within various e-communities. The CBS may encompass electronic marketplaces, consumers, and multiple enterprises.

One embodiment consistent with the principles of the present invention provides a method for composing a business application system from business application components, wherein the components support a plurality of business interactions of a plurality of participants, wherein the business interactions are executed in a predefined consecutive order, the method comprising the steps of: receiving data that identify the participants and the interactions and receiving data that identify the consecutive order; in a first view, displaying areas for each participant; in the first view, displaying first graphical depictions of the interactions, wherein first depictions cover areas that correspond to participants, and wherein adjacent first depictions indicate the consecutive order; in a second view, displacing the first depictions, wherein the first depictions still cover areas that correspond to participants, and wherein previously adjacent first graphical depictions are displayed with a predetermined distance; displaying second graphical depictions between the first depictions of consecutive interactions, the second depictions symbolizing data that qualifies the consecutive interactions; and in a third view, when selected by a user, displaying third graphical depictions of the components that implement the interactions.

Another embodiment consistent with the principles of the present invention provides a method of displaying a value chain optimization in a collaborative business scenario, comprising the steps, executed in a data processing system, of displaying a first view consisting of a plurality of vertical lanes, each representing a participant in the collaborative business scenario; a plurality of interlocking polygons, representing a plurality of activities, wherein the polygons are aligned in the vertical lanes according to the activities of the participants; and a plurality of business benefits, corresponding to the plurality of activities, the plurality of business benefits being shown in a vertical arrangement.

Another embodiment consistent with the principles of the present invention provides a method for creating a collaboration between participants in a business scenario, comprising the steps, executed in a data processing system, of: identifying a collaborative business, participants in the collaborative business, and activities of the participants; identifying functionality of the activities; identifying system requirements used to implement the collaborative business; identifying quantitative and qualitative business benefits based on a collaboration between participants; identifying an industry and corresponding solution maps relating to the collaborative business; and creating a collaboration based on information obtained in the identifying steps. In one instance, the participants are consumers, enterprises, and/or electronic marketplaces.

Yet another embodiment consistent with the principles of the present invention, which provides a system for displaying collaboration between participants in a business community, comprises: first rendering means for rendering a first graphical depiction of a sequence of interactions between the participants; and second rendering means for rendering second graphical depiction, derived from the first graphical depiction, containing information flow. Third rendering means for rendering a third graphical depiction depicts an implementation of the first and second graphical depiction in a physical system. In one instance, the first rendering means renders the interactions depicted as interlocking polygons. The first rendering means further comprises aligning means for vertically aligning representations of interactions involving one of the participants. In one embodiment, the first rendering means further comprises aligning means for vertically aligning representations of the business benefits, wherein the business benefits correspond to at least one participant. In one instance, the first rendering means further comprises aligning means for vertically aligning representations of quantifiable business benefits, wherein the quantifiable business benefits provide a basis for ROI calculations. In one embodiment, the system comprises producing means for producing a link from the first graphical depiction to the second graphical depiction. In one instance, the second rendering means further renders additional information regarding interdependency of the participants in the second graphical depiction. In one embodiment, the second rendering means further renders a sequence of activities. In another embodiment, the second rendering means further renders information sharing between participants. In one instance, the second rendering means further renders roles in the collaboration. In another instance, the second rendering means further renders features in the collaboration. In accordance with one embodiment, the third rendering means further renders a system topology used by a participant. In accordance with another embodiment, the third rendering means further renders distributed and centralized systems.

A further embodiment consistent with the principles of the present invention provides a computer readable medium for controlling a data processing system to perform a method for displaying collaboration between participants in a business community executed in a data processing system, the computer readable medium comprising: a rendering module for rendering a first graphical depiction of a sequence of interactions between the participants; and a second rendering module for rendering a second graphical depiction, derived from the first graphical depiction, containing information flow. In one instance, the computer readable medium further comprises: a third rendering module for rendering a third graphical depiction depicting an implementation of the first and second graphical depiction in a physical system. In another instance, the rendering module includes a representing module for representing a plurality of interactions depicted as interlocking polygons. In another instance, the second rendering module includes a representation module for vertically aligning representations of interactions involving one of the participants. In one embodiment, the rendering module includes a representation module for vertically aligning representations of the business benefits, wherein the business benefits correspond to at least one participant. In another embodiment, the rendering module includes a representation module for vertically aligning representations of quantifiable business benefits, wherein the quantifiable business benefits provide a basis for ROI calculations. In one instance, the medium further includes a producing module for producing a link from the first graphical depiction to the second graphical depiction. In one embodiment, the second rendering module includes a providing module for providing additional information regarding interdependency of the participants. In another instance, the second rendering module includes a depicting module for depicting a sequence of activities. According to another embodiment, the second rendering module includes a depicting module for depicting information sharing between participants. Within the principles of the present invention, the second rendering module may include a depicting module for depicting roles in the collaboration. Also within the principles of the present invention, the second rendering module may include a depicting module for depicting features in the collaboration. In one instance, the third rendering module includes a depicting module for depicting a system topology used by a participant. In another embodiment, the third rendering module includes a depicting module for depicting distributed and centralized systems. In yet another instance, the third graphical depiction is derived from the second graphical depiction and contains additional information regarding the collaboration between participants.

Another embodiment consistent with the principles of the present invention provides a computer readable medium for controlling a data processing system to perform a method for displaying a value chain optimization in a collaborative business scenario executed in a data processing system, the computer readable medium comprising: a displaying module for displaying a first view consisting of a plurality of interlocking polygons, wherein the polygons corresponding to each participant being vertically aligned and the activities of the participants; business benefits of each activity being shown in a vertical arrangement. In one embodiment, the computer readable medium further comprises: a displaying module for displaying a second view consisting of participants of the collaborative business scenario in vertical lanes; activities of the participants depicted illustrated as interlocking polygons; and information flow between the participants illustrated as lines linking the interlocking polygons; and connectors connecting a line and an activity illustrating a direction of document exchange. In another embodiment, the medium of further includes a displaying module for displaying a third view consisting of a system topology at a particular participant's site.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention.

FIG. 10 illustrates an exemplary collaboration scorecard that summarizes the business parameters.

DETAILED DESCRIPTION

Reference will now be made in detail to an implementation consistent with the principles of the present invention as illustrated in the accompanying drawings. Wherever possible, the same reference numbers will be used throughout the drawings and the following description to refer to the same or like parts.

Overview

Methods and systems consistent with the present invention create collaboration between members of an e-community within a Collaborative Business Scenario (CBS). An e-community is a virtual community pursuing a common business goal using electronic commerce. Collaboration is in creating value-generating business processes that extend beyond the boundaries of one enterprise. That is, collaboration combines one enterprise with various business participants from multiple industries. A CBS is several participants in different enterprises working on a common goal linking different activities (e.g., collaborative planning, vendor-managed inventory). To achieve the goal, enterprises share information and define responsibilities for specific activities. As such, the CBS may span several enterprise systems.

Enterprises desire to optimize value chains within a given industry. CBSs provide a tool to analyze, plan, and optimize value chains for an enterprise within a given industry. The CBS may perform value chain optimizations for not only one enterprise but also for other business participants beyond the confines of one enterprise. For example, in an oil and gas enterprise, CBSs may involve engineering project collaboration with engineering suppliers, collaborative planning with distributors, or collaborative forecasting and replenishment with service station retailers.

Figure 1:
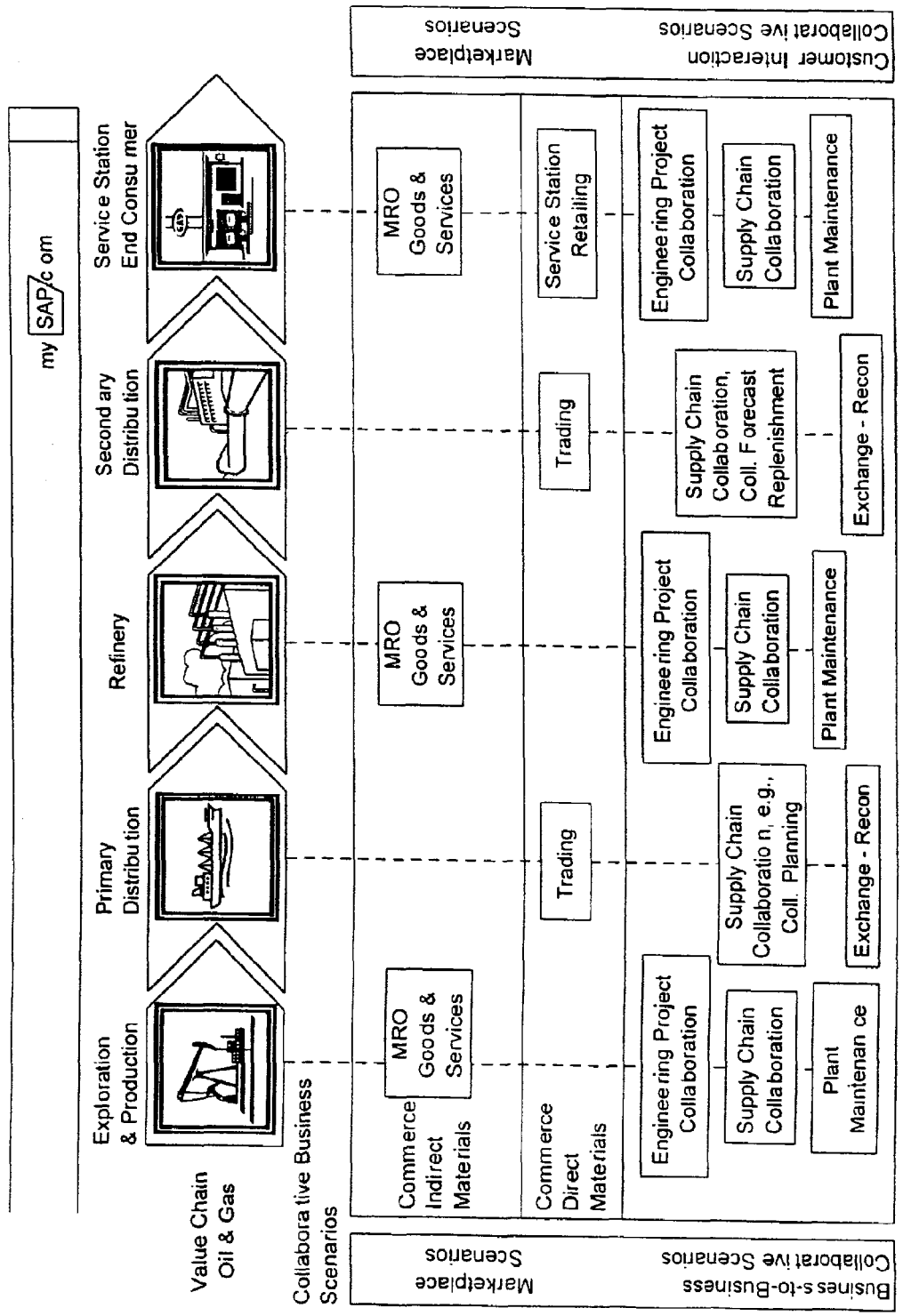
FIG. 1 is an exemplary representation of an oil and gas enterprise value chain showing opportunities for value chain optimization with CBSs.

FIG. 1 depicts an exemplary oil and gas five-step value chain and various CBSs for the oil and gas value chain. The value chain starts with exploration & production of oil and ends with providing the oil at a service station, as indicated in FIG. 1. The CBSs may consist of categories, such as business-to-business scenarios, customer interaction scenarios, or marketplace scenarios.

In the business-to-business scenario, the participants are enterprises; in the marketplace scenario, multiple enterprises cooperate at a single marketplace; and in the customer interaction scenario, a single customer is served by multiple enterprises.

A CBS can be used in a variety of industries or business communities. The CBS consists of various entities, such as participants (e.g., importers, suppliers OEMs, manufacturers, distributors, vendors, sellers, end-customers, insurance companies, publishing companies, service companies, paper manufacturer), activities (e.g., order tracking, receipt processing, production, search requests), information sharing (e.g., business documents, status reports, purchase orders), document flow features (e.g. a search for specified vehicles), roles (e.g., employee roles such as a strategic purchaser), business benefits (e.g., improved buying power, reduced delivery times, cost advantages, increased customer satisfaction), value potential (e.g., 50% increase), type of CBS (e.g., Business to Business Scenario, mySAP.com Marketplace Scenario, Customer Interaction Scenario), and the relationship to an SAP Solution Map, all described below.

Each participant in a CBS acts according to a specific role (e.g., an employee that purchases goods is a purchaser), and each activity contains functionality and relates to a participant's role. CBSs also contain business documents, information flow, and systems landscapes (e.g., roles of the systems, software components, software releases, information to exchange between each system, and functions to process exchanged information within a system). Various aspects of CBSs are also described below. The CBS enables a top-down approach to optimize value chain between enterprises. This allows the inter-company processes as well as cross-industry processes to be described. The CBS also provides an intuitive graphical design illustrating various collaborative aspects. The various illustrations, although directly derived from one another, cover separate aspects, offer complementary information (e.g., business view, interaction view, component view), and define business benefits for various participants. Moreover, the illustrations explain the contribution of each participant of inter-company collaboration to value creation.

In addition, the CBS enables discussion between business partners on new business opportunities using inter-company collaboration. The discussions facilitate discussions between companies and business partners regarding business benefits as well as discussions with software vendors on the feasibility and scope of required software solutions as well as its subsequent implementation. For example, software vendors provide specified functionality that fits into a specific activity of a CBS. Thus, participants may choose to agree with vendors regarding the standards used to exchange documents between activities.

Method of Operation

Figure 2A:
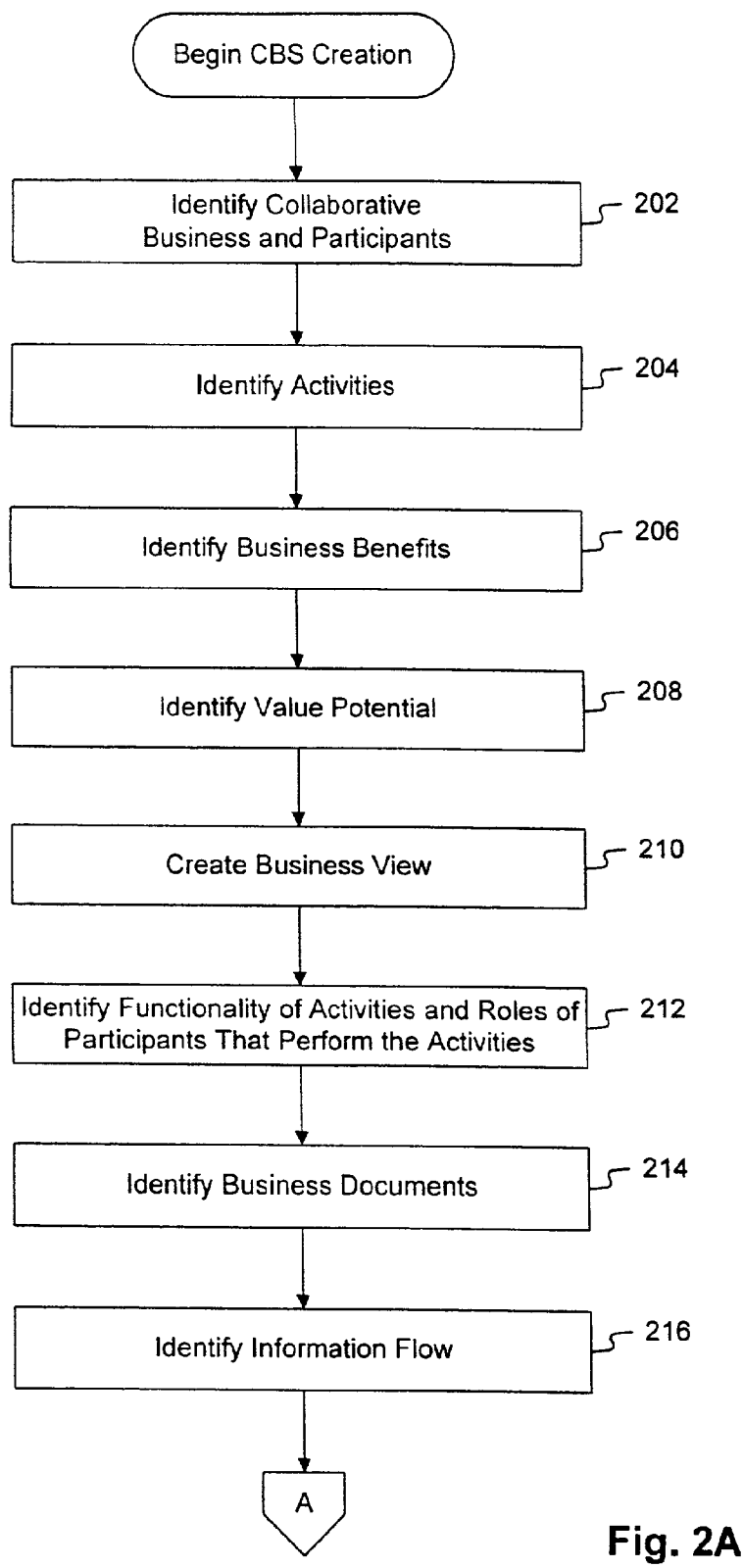
FIGS. 2AB are collectively a flow diagram representing the steps performed by a method consistent with the present invention.
Figure 2B:
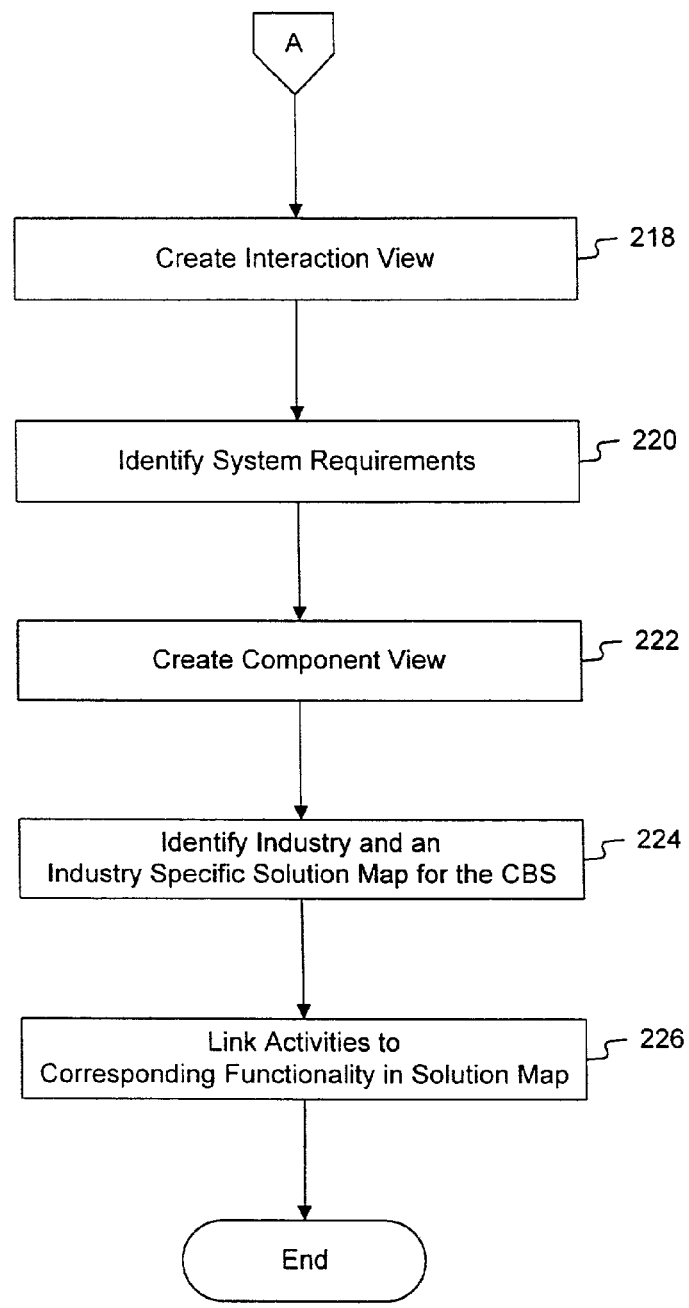

FIGS. 2A and 2B are a flow diagram representing the steps performed by a method consistent with the present invention when creating a CBS. Some aspects of the following method will vary depending on the nature of the activities of the business being evaluated. The following example describes an organization whose principal activity is the manufacture and development of vehicle sales. Information for the CBS may be obtained from various sources, such as industry, business, or value chain expertise, knowledge on value-added activities of each of the participants involved, knowledge on the individual information needs of each role in the entire business scenario, knowledge of employee roles, data modeling expertise, knowledge of the industry business blueprints and Solution Maps (described below), business application expertise (e.g., SAP Financials), implementation expertise, identification of value potentials by realizing collaborative business opportunities that result in tangible business benefits, industry knowledge anticipating the quantifiable business benefits, and/or independent studies (e.g., Harvard Business Review, Goldman Sachs, Management Consulting Firms).

First, all participants in the CBS are identified (step 202). The types of participants identified (e.g., OEM, importers, dealers) will dictate the type of CBS to use. For example, if the participants are employees of different enterprises (e.g., OEM, importer, dealer), the type of CBS is a "Business to Business Scenario" CBS. As another example, if the participants are buyers and sellers in an electronic marketplace, then the type of CBS is a "mySAP.com Marketplace Scenario." In yet another example, if the parties are multiple enterprises working together to supply information to a set of customers, then the CBS is a "Customer Interaction Scenario."

Next, activities performed by the participants to achieve a common business goal are identified (step 204), business benefits are identified (step 206), and value potentials for the business benefits are identified (step 208). With the information identified in steps 202, 204, 206, and 208, a business view is created (step 210). Business views depict the interaction between participants, activities, business benefits, and/or value potentials.

Figure 3:
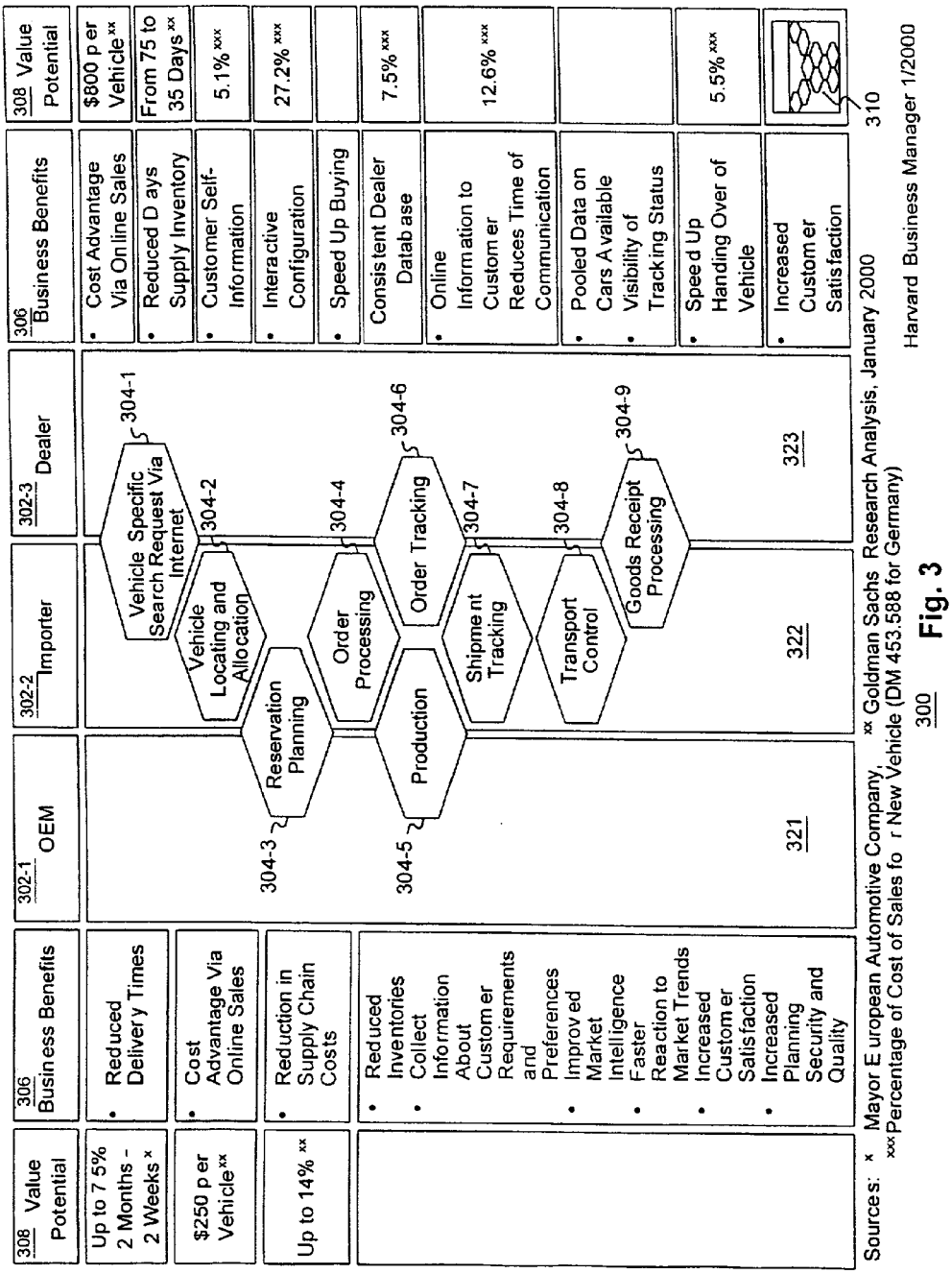
FIG. 3 is an exemplary business view for use in a manner consistent with the present invention.

FIG. 3 depicts an exemplary business view 300 in accordance with the present invention. Business view 300, which is a graphical depiction of interlocking polygons (e.g., hexagons), enables the integration of common business purposes, and the ability to anticipate business benefits while implementing the CBS. Also, business view 300 provides value potential in terms of quantifiable business benefits (e.g., reduced delivery time by up to 75%) that allow return-on-investment (ROI) calculations to be formulated.

View 300 illustrates collaboration between various participants involved (e.g., OEM, importer, and dealer), types of CBS present, collaborative aspects between the participants, scope of the business collaboration, impact on the business and the value chain, anticipated business benefits, and quantifiable value potential.

Business view 300 comprises participants 302, activities 304, business benefits 306, value potentials 308, and zipper button 310. Participants 302 are depicted in vertical lanes 321, 322 and 322 signified in different colors. Activities 304 illustrate the sequence and scope using interlocking hexagon-shaped boxes similar to a zipper. Zipper button 310 links business view 300 to interaction view 400 (described below). In other words, when the user presses button 310, the display changes from business view to interaction view.

Business benefits 306 consist of qualitative business benefits (e.g., improved market intelligence) and quantitative/quantifiable business benefits with so-called value potentials 308 (e.g., reduced delivery times by up to 75%).

Once business view 300 is created, a functionality of each activity 304 and roles of participants that perform those activities 304 are identified (step 212 in FIG. 2), various business documents are identified (step 214), and information flow between participants 302 is identified (step 216). For example, a role of an employee (participant) may be as a strategic purchaser, and the functionality may be to create vehicles pools, or search for new vehicles. Business documents are documents exchanged between activities 304. Finally, information flow relates to information movement between activities 304. With the information from steps 212, 214, and 216, an interaction view is created (step 218).

For convenience, the further explanation distinguishes participants by added reference numbers 1–3. For example, participant 302-1 is an OEM partner, participant 302-2 is an importer, and participant 302-3 is a dealer. Also, the predefined consecutive order by that the business interactions are executed is indicated by indices n and n+1, such as for interactions 304-1 to 304-9.

Figure 4A:
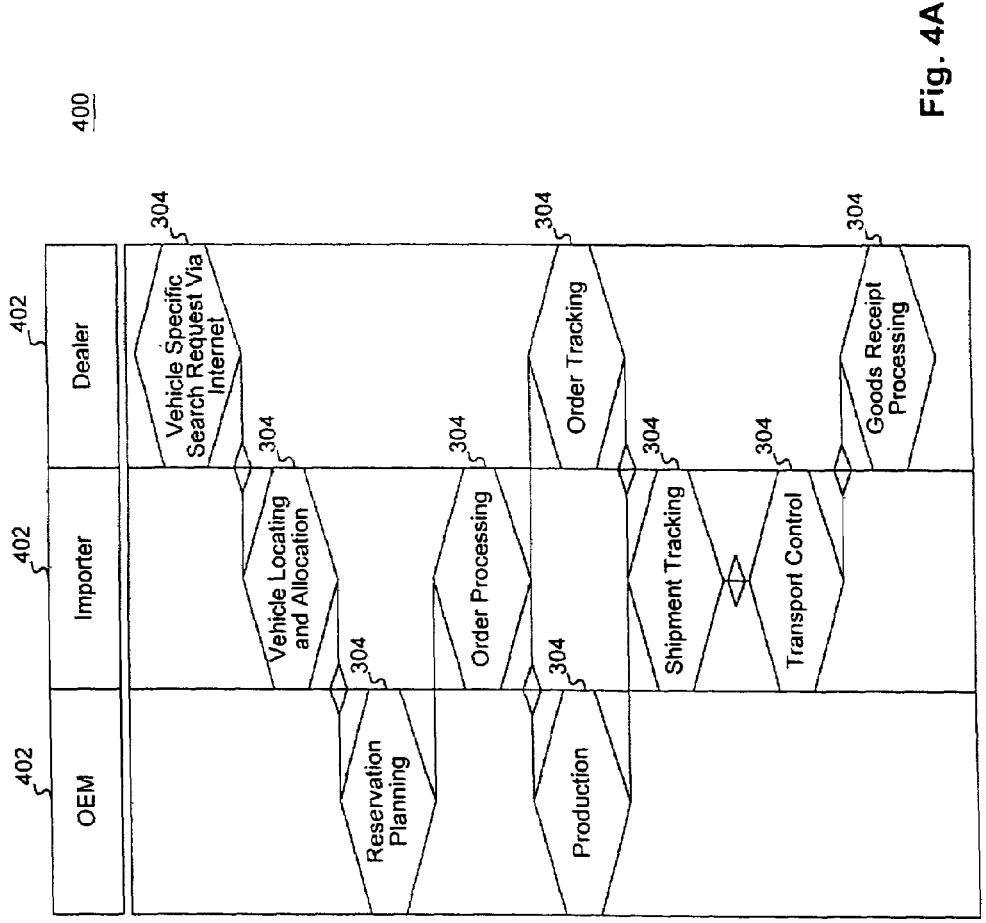
FIGS. 4AB depict exemplary interaction views for use in a manner consistent with the present invention.

FIG. 4A depicts an exemplary interaction view 400 in accordance with the present invention. Interaction view 400 is derived directly from business view 300 and includes additional information, identified in steps 212, 214, and 216, regarding the elements of collaborative interaction between the participants. That is, interaction view 400 contains additional elements detailing how information is exchanged, thereby helping to understand the CBS. Also, interaction view 400 depicts the dependency of participants involved in common business purposes, links to the personalized roles and features included in the collaboration. Thus, enabling a user to view the information exchange between participants, such as information sharing and/or document flow. Information sharing relates to having multiple participants view the same information so information is not duplicated. The term "document flow" refers to sending a document from one participant to another. Thereby the document is copied for the other participant. This is different from "information sharing", where a document stays at is original location without being copied.

Interaction view 400 depicts a sequence of collaborative activities between all participants, roles of the participants in the collaboration, detailed features for each of the collaborative activities, information shared between participants, business documents, and interfaces between the participants. Thereby illustrating the interdependency of the participants in the CBS. Similar to business view 300, interaction view 400 contains participants 402, and activities 304. Lines between activities 304 depict the flow of information and/or exchange of business documents (e.g., sales orders) between participants 402. Double triangles on each line are coded (e.g., shaded) based on the sending participant 402.

Double triangles are codes corresponding to prior activity, for example, the triangle between "vehicle specification search request . . . " and "vehicle locating and allocation" corresponds to "vehicle specification search request . . . ". Colors are conveniently used for coding.

Figure 4B:
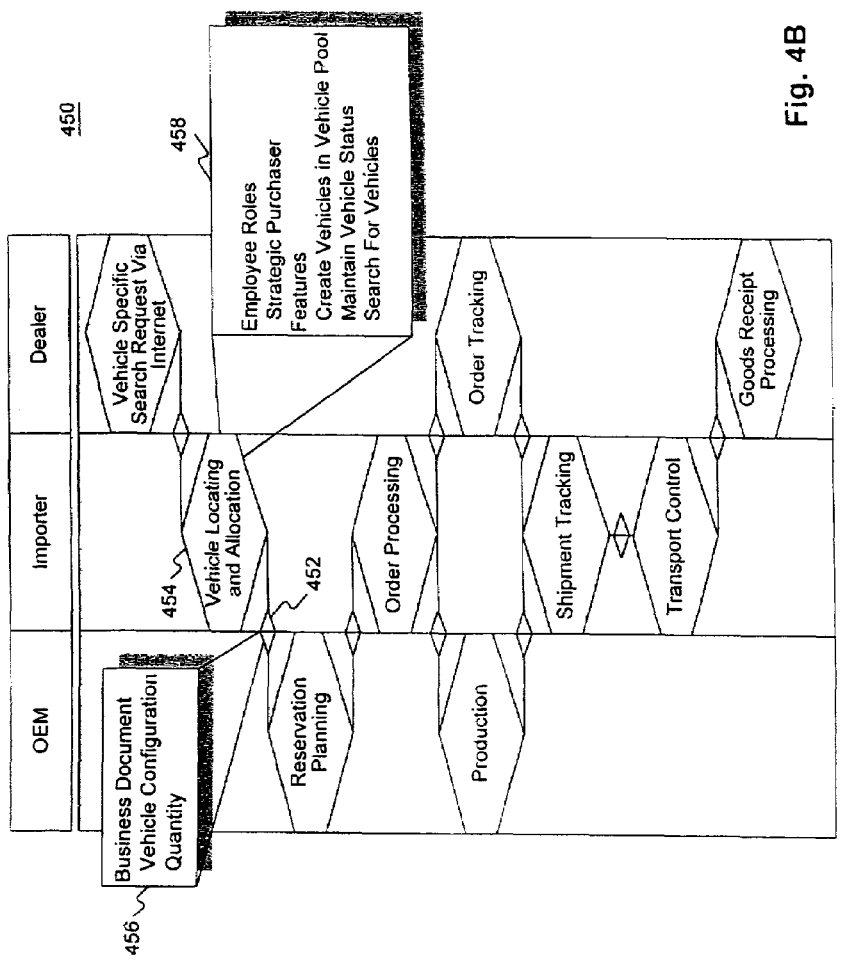

FIG. 4B depicts a second exemplary interaction view 450 in accordance with the present invention. Interaction view 450 depicts various "call-outs" 456, 458 displayed when a user selects an activity 454 or a coded triangle. For example, call-out 456 depicts a vehicle configuration business document related to triangle 452, and call-out 458 depicts the roles of a participant 302 related to the features of activity 454.

A button may link interaction view 400 to component view 500 (described below). Once interaction view 400 is created, system requirements needed to implement the CBS are identified (step 220 in FIG. 2). For example, system requirements may be systems needed to be installed to implement the CBS, system landscapes, roles of the systems, software components, software releases, information to exchange between each system, and functions to process exchanged information within a system. With the information from step 220, a component view is created (step 222).

Figure 5:
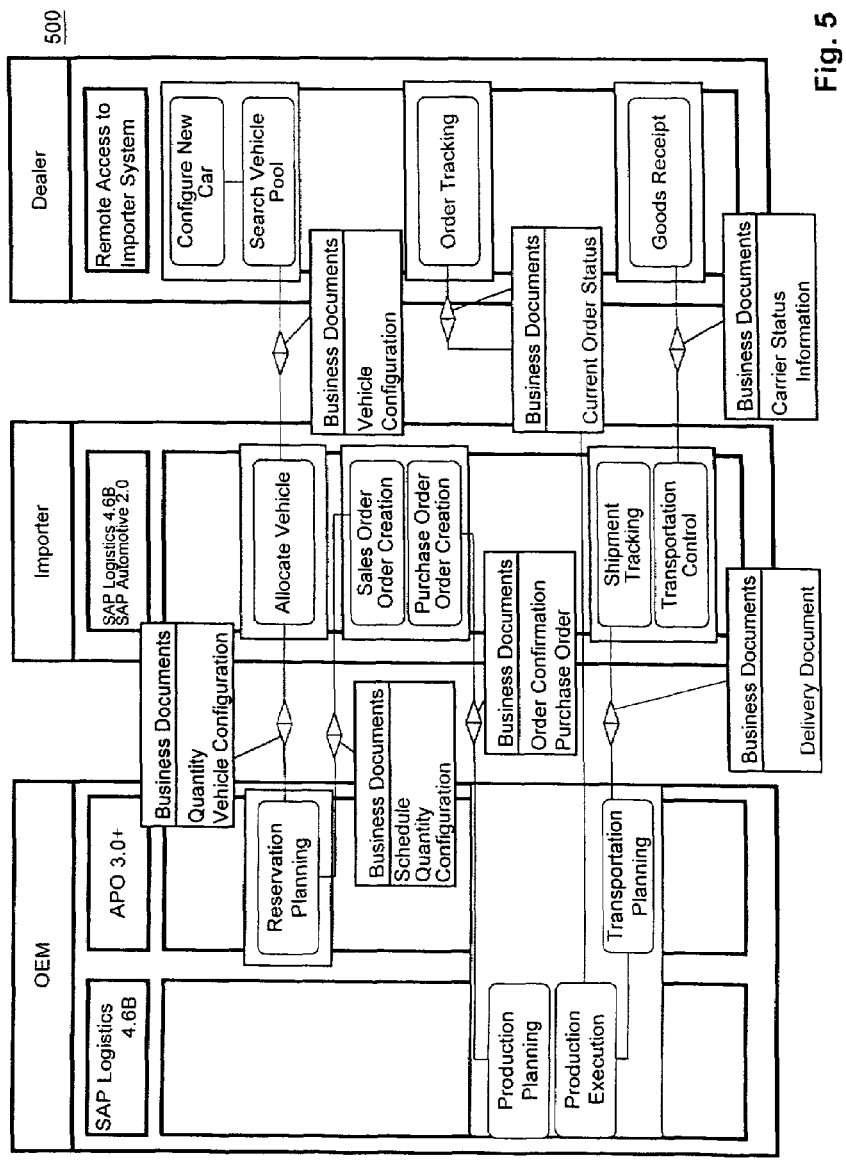
FIG. 5 depicts an exemplary component view for use in a manner consistent with the present invention.

FIG. 5 depicts an exemplary component view 500 in accordance with the present invention. Component view 500 offers a further drill-down view (e.g., technical view) of the CBS and its implementation in an installed systems landscape. The system landscape depicts the different activities of a CBS implemented in all Information Technology (IT) systems. That is, component view 500 depicts the availability of IT systems and specific activities of software components in a CBS. Component view 500 provides an exploded view of the concrete system topology in place at each participant's location. In addition to the system landscape, a concrete system topology includes the connections between various depicted systems (e.g., connecting a participant's location to another participant's location). Component view 500 graphically depicts the overall design of the system landscape, including identification of centralized and distributed systems, individual software components, and current releases. Component view 500 also provides information relating to each system needed to be installed to implement the CBS. For example, a centralized system is the main office of the participant, whereas the distributed system is any additional site (e.g., warehouse, plant site). Component view 500 depicts a CBS at the centralized site as well as the distributed site.

Once a component view 500 is created, a particular industry and corresponding Solution Maps for that industry are identified (step 224 in FIG. 2). A Solution Map is a tool used to analyze strategies and activities for specified industries and preferably depicts a wide range of solutions for various activities. Thus, if a Solution Map contains information that corresponds to functionality of an activity 304, that Solution Map may be linked to the activity (step 226). As an example, Solution Maps relating to the automotive industry may apply to a vehicle sales CBS. And, if the automotive Solution Maps contain solutions that correspond to an activity for purchasing vehicles, a link may be created to that automotive Solution Map from the corresponding activity.

Figure 6:
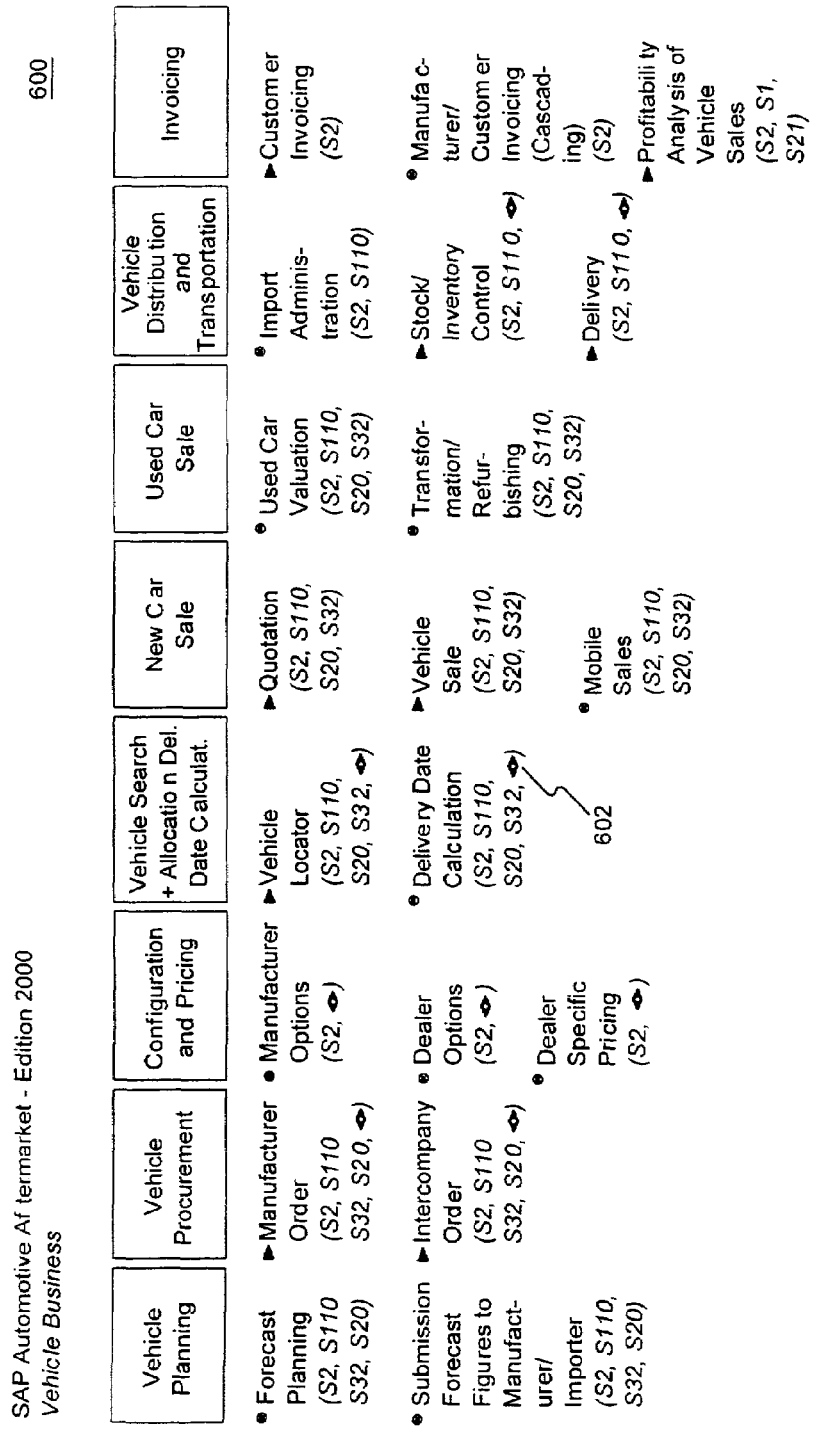
FIG. 6 depicts an exemplary Solution Map for use in a manner consistent with the present invention, the solution map illustrating business application components of a business application system.

FIG. 6 depicts an exemplary Solution Map for use in a manner consistent with the present invention, illustrating a business application component of a business application system. In other words, an exemplary automotive Solution Map that may be linked to a vehicle sales CBS is depicted in FIG. 6. Solution Map 600 contains links 602 to various activities 304 in views 300, 400, 450. Graphical depictions linked to business application components are illustrated by symbols S1, S2 and the like, collectively referred to as "S". For example, components S2, S110, S32 and S20 are applications for the interaction "forecast planning".

Architecture

Figure 7:
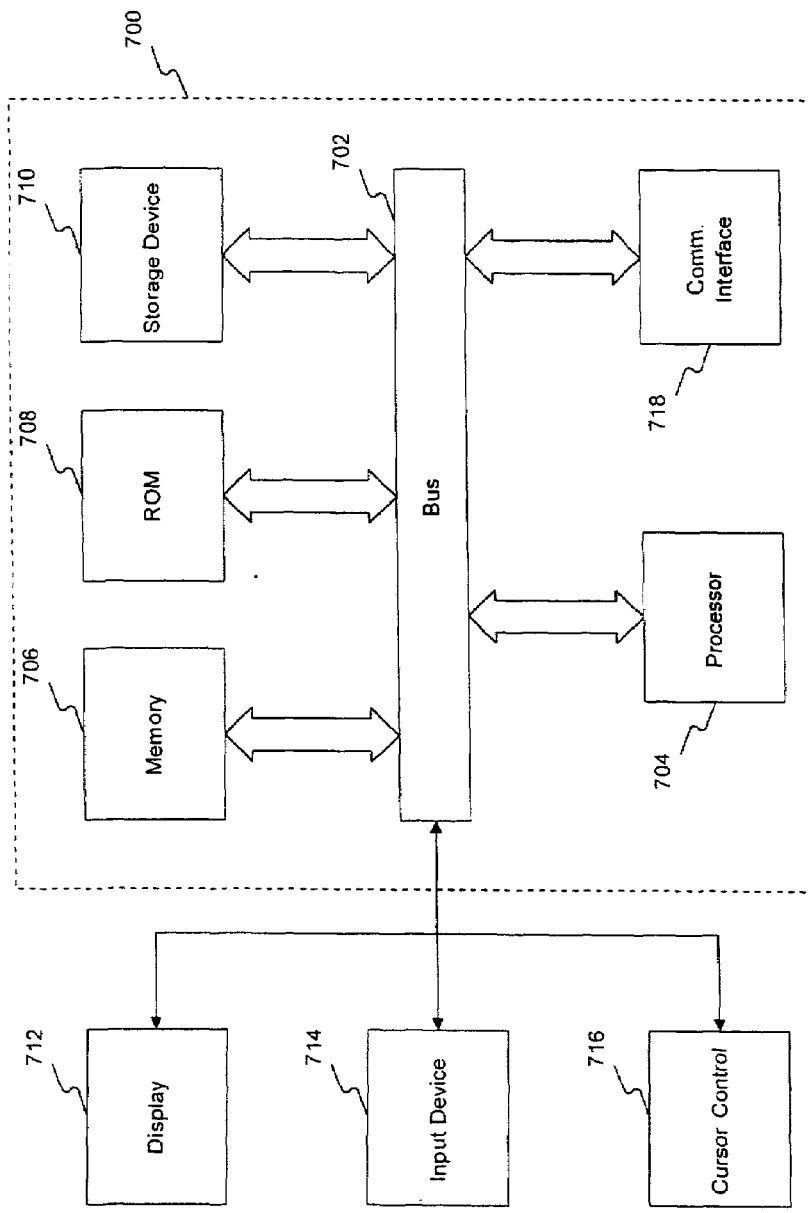
FIG. 7 shows a block diagram of a system for practicing methods and systems consistent with the present invention.

FIG. 7 is a block diagram that illustrates a computer system 700 upon which embodiments of the invention may be implemented. Computer system 700 includes a bus 702 or other communication mechanism for communicating information, and a processor 704 coupled with bus 702 for processing information. Computer system 700 also includes a memory 706, which can be a random access memory (RAM) or other dynamic storage device, coupled to bus 702 for creating business views, interaction views, and component views, and instructions to be executed by processor 704. Memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Preferably, views 300 and 400 are created when processor 704 (cf. FIG. 7) accesses a database (in storage device 710, cf. FIG. 7) using, for example, a database engine and provides the graphical depictions by java applets. The database can be a commercially available database such as Microsoft Access 2000.

Computer system 700 optimizes value chains. Consistent with one implementation of the invention, a graphical depiction of the collaboration of participants is provided by computer system 700 in response to processor 704 executing one or more sequences of one or more instructions contained in memory 706. Such instructions may be read into memory 706 from another computer readable medium, such as storage device 710. Execution of the sequences of instructions contained in memory 706 causes processor 704 to perform the process states described herein. Alternatively hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as memory 706. Transmission media includes coaxial cables, copper wire, and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which processor 704 retrieves and executes the instructions. The instructions received by memory 706 may optionally be stored on storage device 710 either before or after execution by processor 704.

Figure 8:
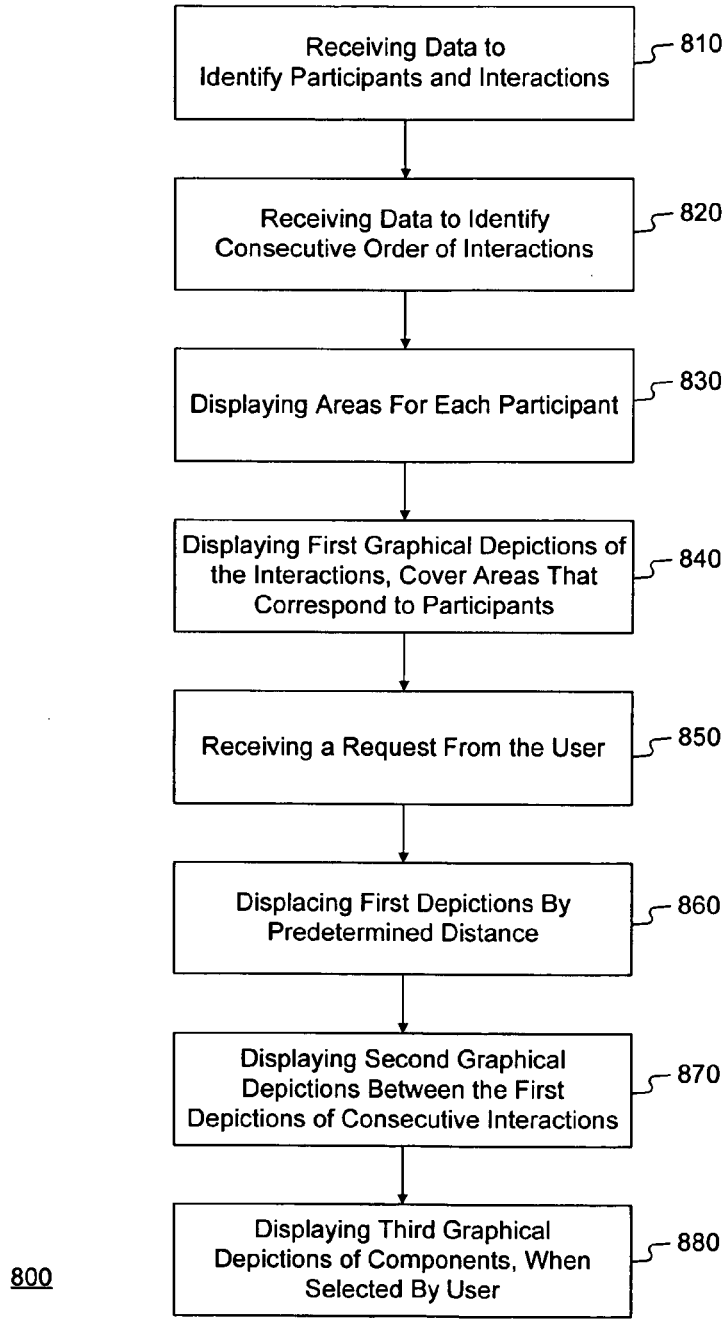
FIG. 8 illustrates an exemplary method flow chart diagram of a method for composing a business application system from business application components.

FIG. 8 illustrates an exemplary method flow chart diagram of method 800 for composing business application system 600 (cf. FIG. 6) from business application components S (cf. FIG. 6). The components (S) support a plurality of business actions or interactions (cf. FIG. 3, 304-1 . . . 304-9) of a plurality of participants (cf. FIG. 3, 302-1, 302-2, 303-3). For example, participant 302-1 is an OEM partner, participant 302-2 is an importer, and participant 302-3 is a dealer. The business interactions are executed in a predefined consecutive order, for example, from interaction 304-1 to interaction 304-9. First depictions 304 indicate the consecutive order, in views 300 and 400 with vertically top down order. Consecutive interactions 304-n and 304-(n+1) are displayed by adjacent depictions (in view 300 only). For example, depictions 304-1 and 304-2 share one side of the hexagon.

Method 800 comprises the following steps: receiving 810 data that identify participants 302 and interactions 304; receiving 820 data that identify consecutive order 304-1 to 304-9; in first view 300 (cf. FIG. 3, "business view"), displaying 830 areas for each participant 302-1, 302-2, and 302-3; in first view 300, displaying 840 first graphical depictions 304 of the interactions, wherein first depictions 304 cover the appropriate areas 321–323 (i.e. lanes) that correspond to participants, and wherein adjacent first depictions (304-n, 304-(n+1)) interlock indicating the consecutive order; in second view 400 (cf. FIG. 4, "interaction view"), displacing 860 first depictions 304, wherein first depictions 304 still cover areas 321–323 that correspond to participants, and wherein first graphical depictions (i.e. that were previously adjacent) are displayed with a predetermined distance between them (cf. FIG. 4); displaying 870 second graphical depictions 452 (cf. FIG. 4AB) between first depictions 304 of consecutive interactions, second depictions 452 symbolizing data that qualifies the consecutive interactions; and in third view 600, when selected by a user, displaying 880 third graphical depictions (S) of the components that implement the interactions.

In one embodiment, step displaying 860 first depictions 304 is performed upon receiving 850 a request from the user to alter first view 300, for example, when the user operates zipper button 310.

As illustrated in FIGS. 3 and 4, in steps displaying 840 first depictions 304 and displaying 860 second depictions 452, first depictions 304 and second depictions 452 are polygons, such as hexagons 304 (FIG. 3) and triangles 452 (FIG. 4), respectively. Optionally, in step displaying 880 third depictions (S), graphical depictions (S) with hyperlinks to interactions are displayed. Optionally, in step displaying 880, depictions (S) are displayed only for available components.

A few of the details and advantages of the method steps are explained in the following. In one embodiment consistent with the principles of the present invention, receiving steps 810 and 820 are performed in connection with steps 202 and 204 (FIG. 2A). Interactions are illustrated, for example, in FIG. 3 as interaction 304-1 ("vehicle specific search request via internet") between participants 302-2 and 302-3; interaction 304-2 ("vehicle locating and allocation") of participant 302-2; interaction 304-3 ("reservation planning") between participants 302-1 and 302-2 and so on. The consecutive order is predefined by the business. For example, action 304-1 ("vehicle specific search") is prior to action 304-5 ("production"). As for step displaying 830, for example, FIG. 3 illustrates the areas by vertical lanes 321, 322, and 323. Step displaying 840 is performed, in one embodiment, in view 300 as illustrated in FIG. 3. Reference numbers (304-1 . . . 304-9) are the same for interactions and first graphical depictions. The first graphical depictions 304 cover various parts of lanes 321-323, depending on the participants. For example, corresponding to the data received in steps 810 and 820, one half of depiction 304-1 (for interaction 304-1) covers part of lane 322 and the other half covers part of lane 323. In one embodiment, view 300 concentrates on participants, interactions and order only and does not distract the user with further information.

In step 850, the user requests a different view, by, for example, operating zipper button 310 expressing his or her desire to see more.

In one embodiment consistent with the principles of the present invention, at step 860, in second view 400, first graphical depictions 304 are displaced. Depictions 304 are still arranged (i) to cover areas 321–322 that correspond to the participants and (ii) to indicate the consecutive order. Consecutive interactions are however displaced in distance in this depiction. Displacing allows the original order as well as the participant-to-interaction relation to remain unchanged. It also allows the display of further graphical depictions in step 870. In one embodiment, second depictions 452 contrast to first depictions 304 by being smaller. Displaying 880 third view 600 ("solution map") upon user selection, allows systems consistent with the present invention to guide the user directly to the third graphical depictions (e.g., S) of the components that implement the interactions. In one embodiment, only those components available are depicted.

Referring back to FIG. 7, in one embodiment consistent with the principles of the present invention, sequences of instructions contained in memory 706 cause processor 704 to perform process 800. Hence, a computer program product or computer-readable medium with instructions that cause a processor to execute method 800 would be an example of embodiment consistent with the principles of the present invention.

Figure 9:
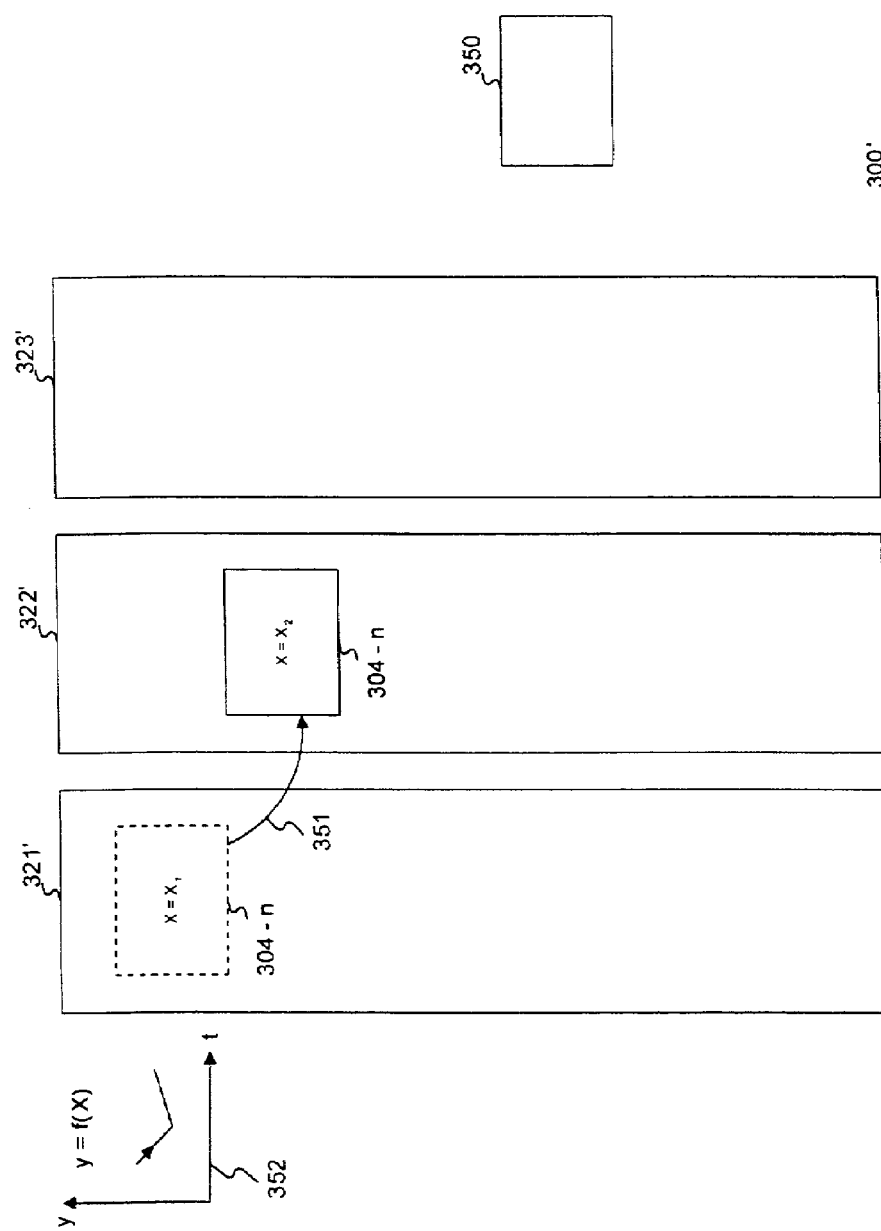
FIG. 9 illustrates an exemplary diagram of a further view for further embodiments of the present invention.

FIG. 9 illustrates an exemplary diagram of view 300' to describe further embodiments (1), (2) and (3) consistent with the principles of the present invention. View 300' stands for any of views 300-600 discussed above. Lanes 321', 322', and 323' correspond to the areas for each participant.

(1) In one embodiment, optionally, information objects attached to the collaborative business scenario (e. g., to view 300, 400 or 600) provide further detailed information regarding the definition of the business interaction between the participants that are involved. The information objects can relate to a global level (describing the entire scenario), or to an object level (by activity, by participant, etc.). The user accesses the information objects by selecting buttons or hyperlinks in any view, collectively illustrated by task bar 350 in view 300' of FIG. 9.

On the global level, the information objects are, for example instruction materials that further detail the collaborative business scenario. Examples comprise web-based course materials (e.g., virtual classroom sessions) or demonstrations that provide a demonstration of the business process and the sequence of activities by the various participants on the system.

On the object level, information objects can be documents specifying the service levels agreed to between the participants or documents that specify constraints and business rules that the participants interacting in the business transaction have agreed upon. Examples comprise service level agreements (e.g., participants agree to respond within 24 hours), constraints (e.g., participant can only deliver up to 500 parts a day), quality standards (e.g., parts delivered are in compliance with ISO standards), business rules (e.g., shipping and handling fees are covered by the recipient).

(2) In another embodiment, as part of the value chain optimization, activities and responsibilities can be shifted from one participant to the other, for example, from participant 302-1 to participant 302-2 (cf. FIG. 3). As illustrated in FIG. 9 by an arrow 351, the user has shifted depiction 304-n from lane 321' to lane 322'. In other words, depiction 304-n disappears (illustrated dashed) from the lane of the first participant and appears in the lane of the second participant. Suppose that business parameter Y is a function of variable X and that X is related to interaction 304-n; and that parameter Y is displayed as a business benefit (e.g., as business benefit 306 in view 300, cf. FIG. 3). Upon detection of user-invoked shifting of the depiction, variable X changes from X1 to X2 and therefore Y changes too. The user who has moved depiction 304-n over the lanes now sees the potential influence. Reassigning interactions between the participants can be a benefit or a risk for the business. In any case, the user is informed (by variable Y, e.g., the business benefit). Thus, systems consistent with the principles of the present invention provide further enhancement of the value chain optimization and can result in a better overall performance of the value chain as the new business model may be more beneficial. Reasons for higher performance can be that the overall process is thereby simplified, and that the shifted activity and responsibility can be done more effectively by another participant as it falls into the core competency of this participant.

Shifting activities and responsibilities between business participants is an element of value chain optimization, and some embodiments consistent with the principles of the present invention detect the shift of responsibilities and activities by the user, for example, when the user drags one interaction descriptor from one lane to another lane. It is not important whether this occurs in business view 300 or in interaction view 400, or in some other view. Shifting by the user causes automatically recalculating and updating of business parameters. This allows the user to be always informed about the present business scenario and its business value. In one embodiment, method 800 (cf. FIG. 8) further comprises: detecting that a user shifts first depiction 304-n from first area 321 to second area 322, updating variable X that is related to first depiction 304-n (X depends on which area the first depiction covers), and updating and displaying second variable Y that is a function of first variable X.

(3) In yet another embodiment of the present invention not only is the user helped to evaluate a current collaborative business scenario but also helped to compare it with the intended future flow and sequence of the business activities between the business participants. In this context, the initial status is compared with the envisioned solution design. The system automatically indicates value changes ("deltas"). This capability is convenient to (a) indicate the changes taking place (change management), (b) identify the improvement areas for optimizing the collaborative business scenario, and (c) pinpoint those aspects (e.g., by highlighting) that need to be adapted in the process landscape as well as in the application and systems landscape (customizing and configuration of systems).

FIG. 9 illustrate this past, present and future time aspect by a simplified time diagram 352 of business value Y. It is further possible to preliminary store scenarios for different values of Y at different times so that the user can replay the history of the scenario optimization.

FIG. 10 illustrates an exemplary collaboration scorecard 300" (e.g., a spread sheet) that summarizes the business parameters in yet another embodiment (4). The value potential for each of the participants has been calculated and is now display for each participant in lanes 321", 322" and 323". A column on the left-hand side indicates the business benefits, e.g., reduced operating cost. The user can fill in the current cost base (i.e. the annual operating cost associated with the process) and multiply that figure with the value potential (which, as shown in this figure can be up to 50%) and arrive at the annual cost savings that can be expected in the area of, for example, operating cost via the implementation of Collaborative Business Scenario.

Presenting the present invention by assuming a single user is convenient for explanation, but not required. As is well known to those of ordinary sill in the art, two or more users can use methods and systems consistent with the principles of the invention to see views such as 300, 400, 500, 600, 300' and 300" (collaborative business scenario) via well-known communication means (e.g., via internet) to simultaneously share the views. Within a single session, business participants can alter or change various calculations. In one embodiment, method 800 further comprises receiving instructions to alter any of the first, second, and third views from a first and a second user, wherein the second user is a remote user.

CONCLUSION

Systems and methods consistent with the present invention create collaboration between members of an e-community within a CBS. The CBS combines one enterprise with various business partners from multiple industries to maximize the value potential for the participants involved in the collaboration. The CBS also provides tools to conceive and discuss new collaborative business models within various e-communities. The CBS may encompass electronic marketplaces and consumers.

The foregoing description of implementations consistent with the invention has been presented for purposes of illustration and description. It is not exhaustive and does not limit the invention to the precise form disclosed. Modifications and variations are potential in light of the above teachings or may be acquired from practice of the invention. Persons skilled in the art will appreciate that other e-communities may be used, such as automotive, chemicals, or high technology. Moreover, the described implementation includes software but the present invention may be implemented as a combination of hardware and software or in hardware alone.

We claim:

1. A method for displaying a supply-chain collaboration between supply-chain participants, wherein the supply-chain participants are members of a business community and the supply-chain participants interact according to a predefined consecutive order, the method comprising:

receiving data that identifies the supply-chain participants and interactions between the supply-chain participants;

receiving data that identifies the consecutive order of the interactions;

processing the data received to display in a first view, at least two columns representing business activities of the supply-chain participants, wherein each column represents at least one of the supply-chain participants in the interactions, order of the columns from left to right represents a flow of goods, and the business activities are represented by individual polygons within the at least two columns;

processing the data received to display in the first view, the business activities in individual polygons, wherein the polygons are positioned adjacent to each other and to represent the interactions between the supply-chain participants in the supply-chain collaboration;

processing the data received to display in a second view, the at least two columns in the same order as the first view, wherein the polygons are not adjacent and are connected by lines, and the interactions between the supply-chain participants are represented by the lines connecting the polygons;

processing the data received to display in a third view, the at least two columns, wherein the at least two columns include at least one additional column, each of the at least one additional columns representing specific computer components used to implement the interactions between the supply-chain participants and utilization of the computer components by the supply-chain participants.

2. The method of claim 1 further comprising, displaying on the left of the at least two columns in the first view, an additional two columns, one of the additional two columns listing qualitative business benefits provided by the supply-chain collaboration of the supply-chain participants, and the second of the additional two columns representing quantitative business benefit information, wherein the qualitative and quantitative business benefit information represents upstream benefits from the supply-chain collaboration between the supply-chain participants.

3. The method of claim 1 further comprising, displaying on the right of the at least two columns in the first view, an additional two columns, one of the two additional columns listing qualitative business benefits provided by the supply-chain collaboration of the supply-chain participants, and the second of the two additional columns representing quantitative business benefit information, wherein the qualitative and quantitative business benefit information represents downstream benefits from the supply-chain collaboration between the supply-chain participants.

4. The method of claim 1, further comprising generating the second view upon receiving a request from a user to alter the first view.

5. The method of claim 1, wherein the polygons in the first view are hexagons.

6. The method of claim 1, wherein displaying, in the third view, comprises displaying availability of the components.

7. The method of claim 1, further comprising:

detecting that a user shifts at least one of the polygons from a first area to a second area;

updating a variable that is related to the at least one of the polygons and that depends on which area the at least one of the polygons covers; and updating and displaying a second variable that is a function of the first variable.

* * * * *